US006530484B1

(12) United States Patent
Bosman (10) Patent No.: US 6,530,484 B1
(45) Date of Patent: Mar. 11, 2003

(54) DENSE MEDIUM CYCLONE SEPARATOR (75) Inventor: Jeremy Brett Bosman, Kempton Park (ZA)

(73) Assignee: Multotec Process Equipment (Proprietary) Ltd. (ZA)

( * ) Notice: Subject to any disclaimer, the term of this patent is extended or adjusted under 35 U.S.C. 154(b) by 0 days.

(21) Appl. No.: 09/715,310

(22) Filed: Nov. 17, 2000

(30) Foreign Application Priority Data

Nov. 18, 1999 (ZA) .............................. 99/7173
Sep. 6, 2000 (ZA) ........................ 2000/4677

(51) Int. Cl.[7] .......................... B01D 21/26; B04C 5/12
(52) U.S. Cl. .................. 209/732; 209/733; 209/724; 209/725; 210/512.1
(58) Field of Search ............... 209/724, 725, 209/208, 727, 732, 733, 726; 210/512.1, 512.3, 788

(56) References Cited

U.S. PATENT DOCUMENTS

| 1,509,915 | A | * | 9/1924 | Stebbins | 209/722 |
| 2,799,208 | A | * | 7/1957 | Scott | 209/729 |
| 2,927,693 | A | * | 3/1960 | Freeman et al. | 209/731 |
| 3,557,956 | A | * | 1/1971 | Braun et al. | 209/166 |
| 4,397,741 | A | * | 8/1983 | Miller | 209/170 |
| 5,180,486 | A | * | 1/1993 | Smolensky et al. | 210/195.1 |
| 5,323,914 | A | * | 6/1994 | Henricson et al. | 209/210 |

FOREIGN PATENT DOCUMENTS

WO    WO 86/06653    * 11/1986

OTHER PUBLICATIONS

Derwent Abstract 1993–108078 (Zaidman et al., Abstract of SU 1727918; Apr. 1992.).*
Derwent Abstract 1993–092152 (Zholondkovsii, Abstract of SU 1726075; Apr. 1992).*
Derwent Abstract 1992–055061 (Boguslavsk et al., Abstract of SU 1634954A; Mar. 1991).*
Derwent Abstract 1982–69827E (Serdtsev et al., Abstract of SU 874128B; Oct. 1981).*

* cited by examiner

Primary Examiner—Donald P. Walsh
Assistant Examiner—Joseph C Rodriguez
(74) Attorney, Agent, or Firm—Webb, Ziesenheim Logsdon Orkin & Hanson. P.C.

(57) ABSTRACT

The invention provides a cyclone adapted for use in a dense medium separation process comprising an inlet chamber having a tangential raw material feed inlet, a vortex finder extending into the inlet chamber, and defining a low gravity fraction outlet for a low gravity fraction of separated material, a conical section opposed to the vortex finder extending and converging in a direction away from the inlet chamber, an outlet chamber extending co-axially with the conical section and in a direction opposed to the inlet chamber and providing an unobstructed flow path to a high gravity fraction outlet for a high gravity fraction of separated material being disposed generally tangentially relative to the outlet chamber.

20 Claims, 7 Drawing Sheets

DENSE MEDIUM CYCLONE SEPARATOR

FIELD OF THE INVENTION

This invention relates to a cyclone particularly adapted for use in a dense medium separation process.

The expression "dense medium separation process" herein means separation of a particulate material into dense and less high gravity fractions at a predetermined cut point. In the process the particulate material is carried in a dense liquid medium which typically comprises a mixture of water and particles of dense material such as ferrosilicon or magnetite.

BACKGROUND OF THE INVENTION

Conventional dense medium cyclones comprise a cylindrical inlet chamber into which raw material is fed tangentially, so that circular motion is imparted to the material in the chamber. A low gravity fraction or floats, are extracted from the inlet chamber through a vortex finder which extends into the inlet and which leads to an outlet direct chamber. A cone formation depends from the inlet chamber in a direction opposed to the vortex finder, and terminates at its remote end in an axially disposed outlet for the high gravity fraction or sinks. With cyclones of this type, the through put and performance is limited by the flow through the axial outlet. It is moreover not possible to increase the size of the outlet beyond a certain percentage of that of the vortex finder, because of design criteria. For many applications therefor, cyclones of this type are operated at a reduced feed rate, in order to obtain the required cut between the low gravity fraction and high gravity fraction.

SUMMARY OF THE INVENTION

It is accordingly an object of the present invention to provide a novel dense medium cyclone which it is believed will exhibit an improved throughput relative to conventional cyclones.

According to the present invention, a cyclone adapted for use in a dense medium separation process comprises an inlet chamber having a tangential raw material feed inlet, a vortex finder extending into the inlet chamber, and defining a low gravity fraction outlet for a low gravity fraction of separated material, a conical section opposed to the vortex finder extending and converging in a direction away from the inlet chamber, an outlet chamber extending co-axially with the conical section and in a direction opposed to the inlet chamber, and providing an unobstructed flow path to a high gravity fraction outlet for a high gravity fraction of separated material being disposed generally tangentially relative to the outlet chamber. It has been found that such an arrangement permits a greater volume of high gravity fraction to pass through the outlet in relation to the conventional cyclones described above.

In one arrangement according to the invention, a volute duct formation is provided adjacent the outlet chamber, such volute duct formation coupling the outlet chamber to the tangential high gravity fraction outlet thereof. Preferably, the volute duct formation will spiral outwardly from the conical section through about 180 degrees.

In one arrangement, the tubular section will preferably be of a constant diameter. Preferably the diameter of the tubular section will be substantially the same as that of the inlet chamber, although variations may be possible in this regard. Thus for example, an inwardly tapering conical section can be interposed between the inlet chamber and the tubular section. Alternatively, the tubular section could for example be in the form of a cone structure which converges from the inlet Head to the outlet thereof.

The invention further provides for the high gravity fraction outlet optionally to be throttled to provide a pressure drop across such outlet, if required. In a preferred arrangement, the ratio between the diameter of the inlet chamber and that of the high gravity fraction outlet will be in the order of 7.8. Thus, for a cyclone where an inlet chamber has a diameter of 660 mm, the high gravity fraction outlet will preferably have a diameter in the order of 85 mm.

Also according to the invention, the cyclone includes a vortex extractor downstream from the high gravity fraction outlet. Such vortex extractor could comprise a tangential extractor inlet to an extractor chamber, and an axially disposed outlet which could be throttled.

Also included within the scope of the invention is a method of separating liquid borne raw material into a low gravity fraction and a high gravity fraction in a dense medium separation process comprising the steps of providing a cyclone in accordance with the invention, introducing raw feed into the cyclone tangentially through the inlet into the inlet chamber to cause rotational movement thereof within the chamber, withdrawing a low gravity fraction of the material through the vortex finder, and withdrawing a high gravity fraction of material tangentially through the high gravity fraction outlet disposed towards the remote end of the outlet chamber.

BRIEF DESCRIPTION OF THE DRAWINGS

Other features of the invention will appear from the preferred embodiment which is disclosed below as a non-limiting example of the invention, with reference to the accompanying drawings wherein.

DETAILED DESCRIPTION OF THE INVENTION

Referring to the drawings, a cyclone 10 suitable for use in dense medium separation process comprises an inlet chamber zone 11 having a tangential inlet 12. Raw feed introduced into the inlet chamber zone 11 through the tangential inlet 12, will thus swirl circularly in the inlet chamber zone 11 resulting in a separation of denser (high gravity) and less dense (low gravity) particles at a required cut point. Thus, denser particles including the dense medium of the feed (which could typically be magnetite or ferrosilcon), move to the outer peripheral zone of the inlet chamber 11, while less dense particles report towards the axis of the inlet chamber zone 11 at a vortex formed by the swirling motion.

Figure 1:
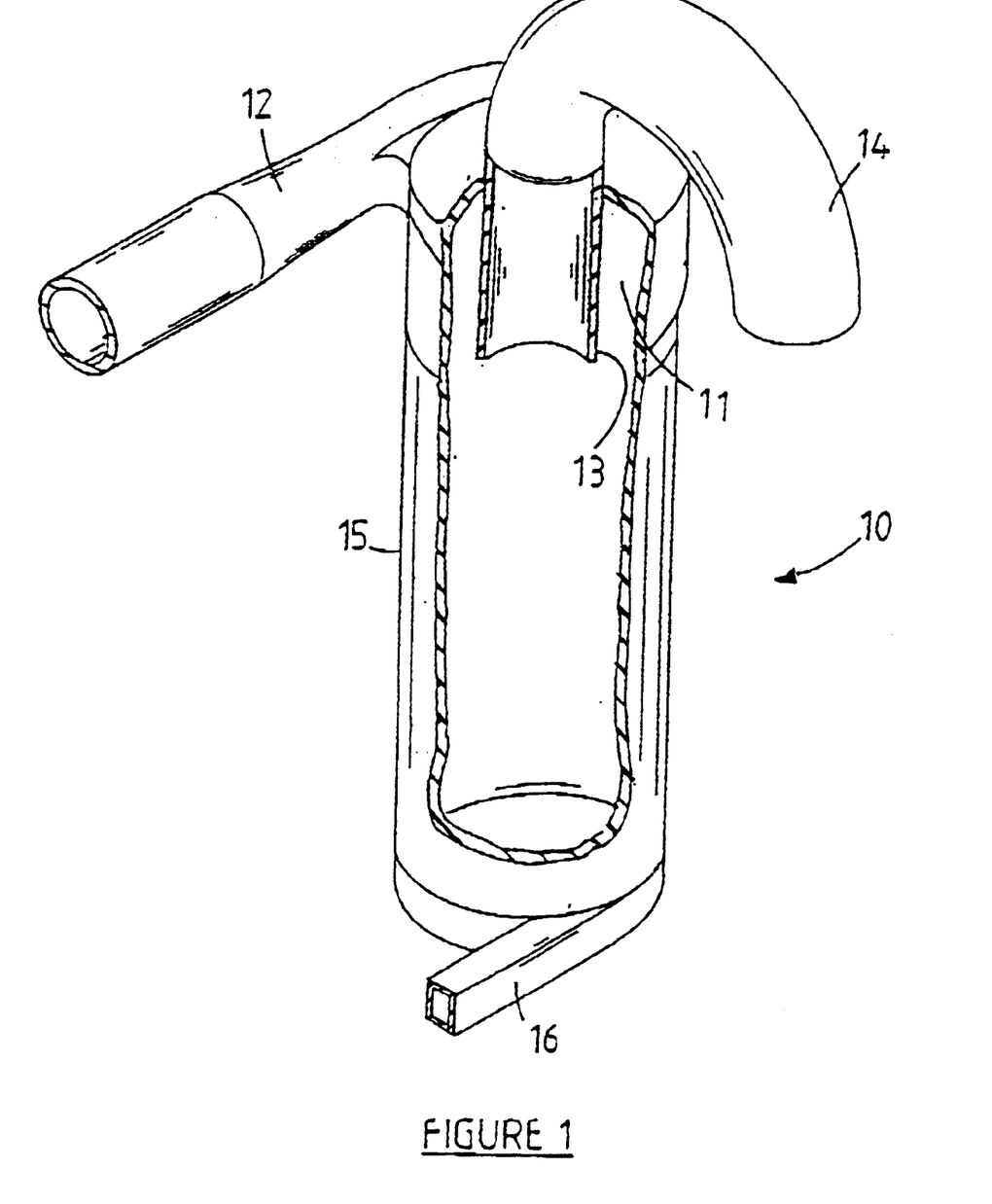
FIG. 1 is a schematic partially sectioned perspective view of a dense medium cyclone in accordance with the invention.

A co-axial tubular section 15 extends from the inlet chamber zone 11 in a direction opposed to the vortex finder 13. It is envisaged in one embodiment that the tubular section 15 will have substantially the same diameter as the inlet chamber 11, and will be of a substantially constant diameter along its length, FIG. 1. Alternatively, a conical section 15a could extend from the inlet chamber 11 and terminate in a cylindrical outlet chamber 15b, FIG. 5.

Figure 3:
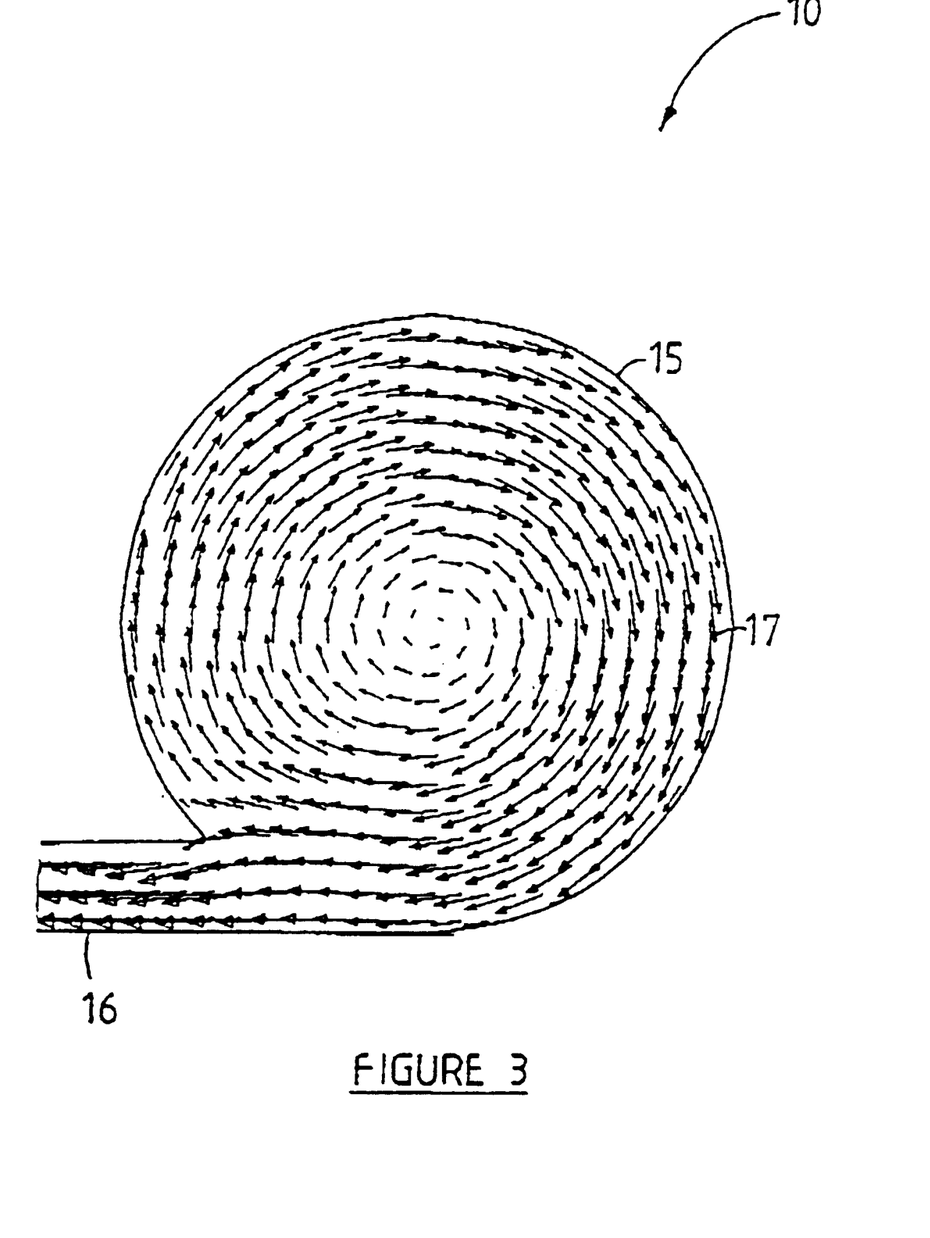
FIG. 3 is an illustration of a computer simulation of flow patterns of material in the cyclone at the outlet thereof for the high gravity fraction of separated materials.

It is a feature of the invention that a high gravity fraction outlet 16 for the high gravity fraction of separated material will be disposed towards the end of the tubular section 15, and will be arranged generally tangentially relative to the periphery of the tubular section 15, the arrangement being one wherein the outlet faces into the stream of particles 17, FIG. 3, rotating in the tubular section 15. Preferably, the high gravity fraction outlet 16 will extend from the tubular section 15 at the remote end thereof.

Figure 2:
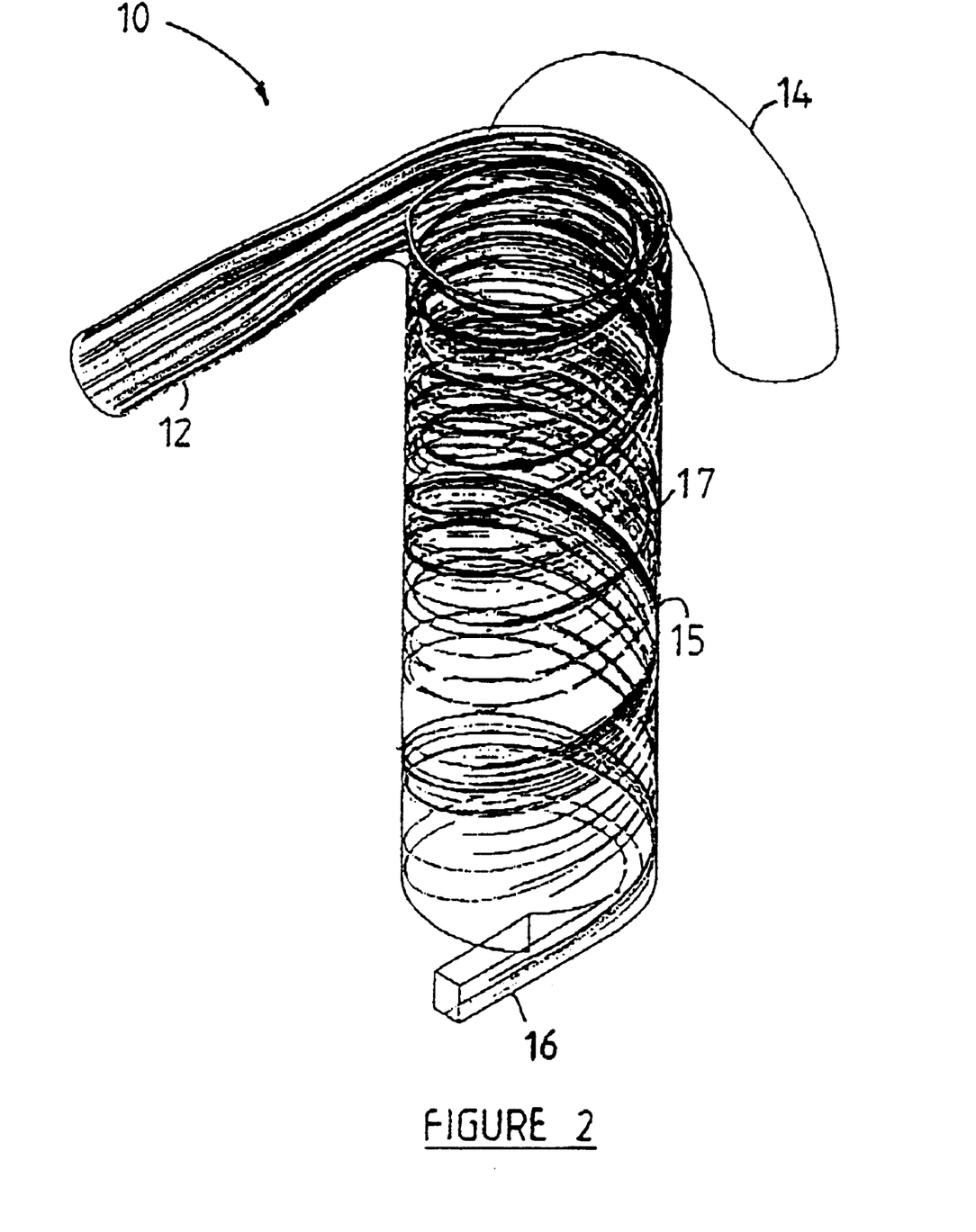
FIG. 2 is an illustration of a computer simulation of flow patterns of material in the cyclone in FIG. 1.

With reference to FIG. 2 and FIG. 3 which is a computer simulated model of flow patterns of the high gravity fraction of the material in the cyclone 10 of the invention, it will be noted that particles 17 passing into the high gravity fraction outlet 16 do not undergo a substantial change in flow direction, permitting greater high gravity fraction withdrawal.

Figure 4:
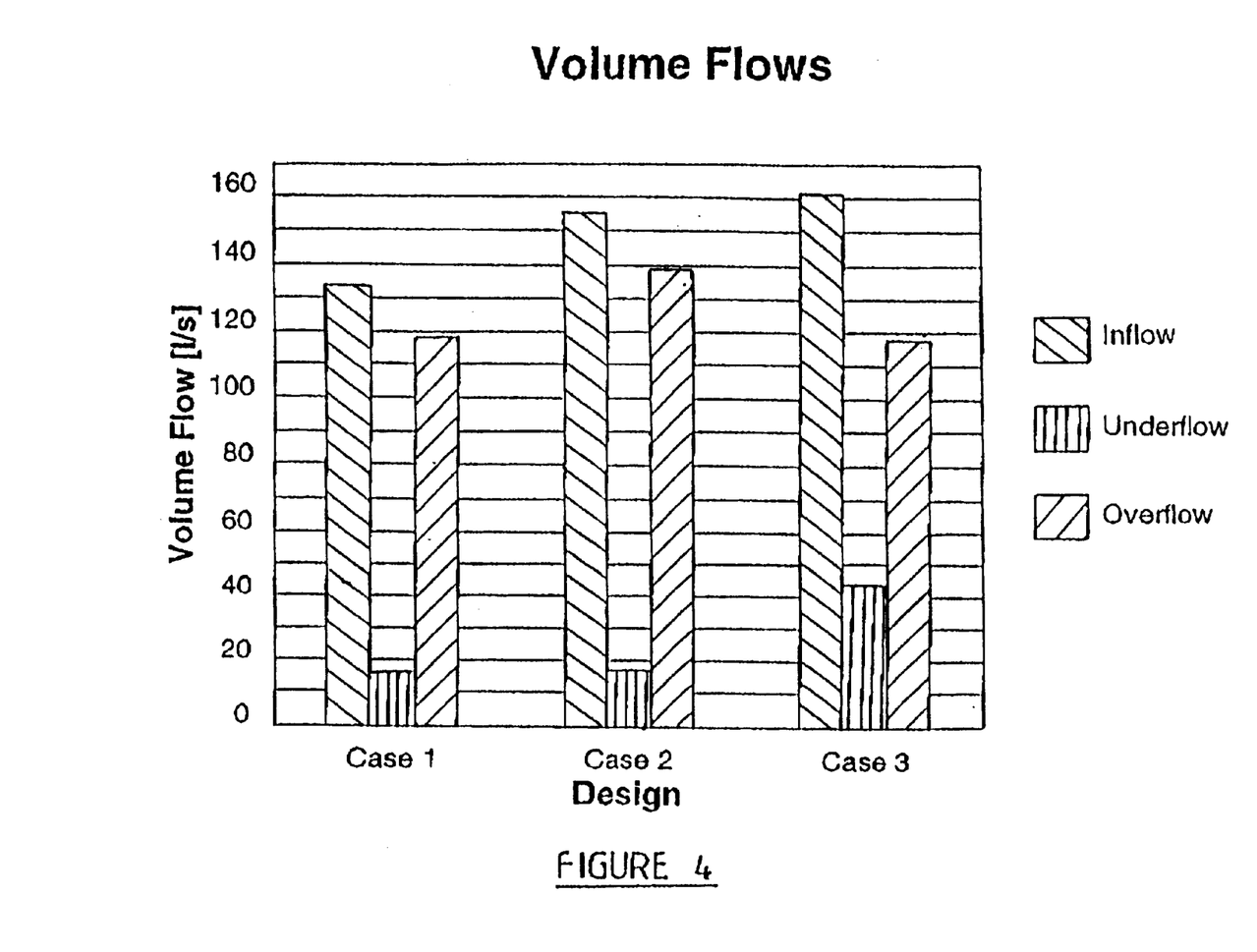
FIG. 4 is a graphic representation of the results of a computer simulated model of a cyclone in accordance with the invention compared to the computer simulated results of a model of a conventional cyclone.

The results of the computer simulation are shown graphically in FIG. 4, and are compared with the results of a conventional computer simulated model.

With reference to FIG. 4, the following experiments are tabulated:

(i) Case one illustrates the results achieved with a conventional dense medium cyclone. For an inflow of approximately 133 l/s, an underflow of approximately 16 l/s, and an overflow of approximately 117 l/s was achieved.

(ii) In case two, the results of a conventional heavy medium cyclone are again illustrated and in this instance, the inflow was increased to 155 l/s. It will be noted however, that the underflow did not increase significantly, and remained at approximately 16 l/s, while the overflow increased to 139 l/s. It was thus found that the limiting factor for throughput was the flow rate of the underflow. An increase in inflow will not necessarily increase underflow, but merely increase overflow resulting in a shift in the cut point.

(iii) Case three shows the results of a dense medium cyclone in accordance with the invention. In this cases the inflow is increased to 162 l/s. This resulted in a significant increase in the underflow, namely to 43 l/s, while the overflow was in the region of 119 l/s.

The computer simulated experiments thus show that with the cyclone of the invention, a withdrawal of the high gravity fraction from the cyclone, is significantly enhanced. This in turn results in the ability to increase the overall throughput of the cyclone at a predetermined cut rate.

Figure 5:
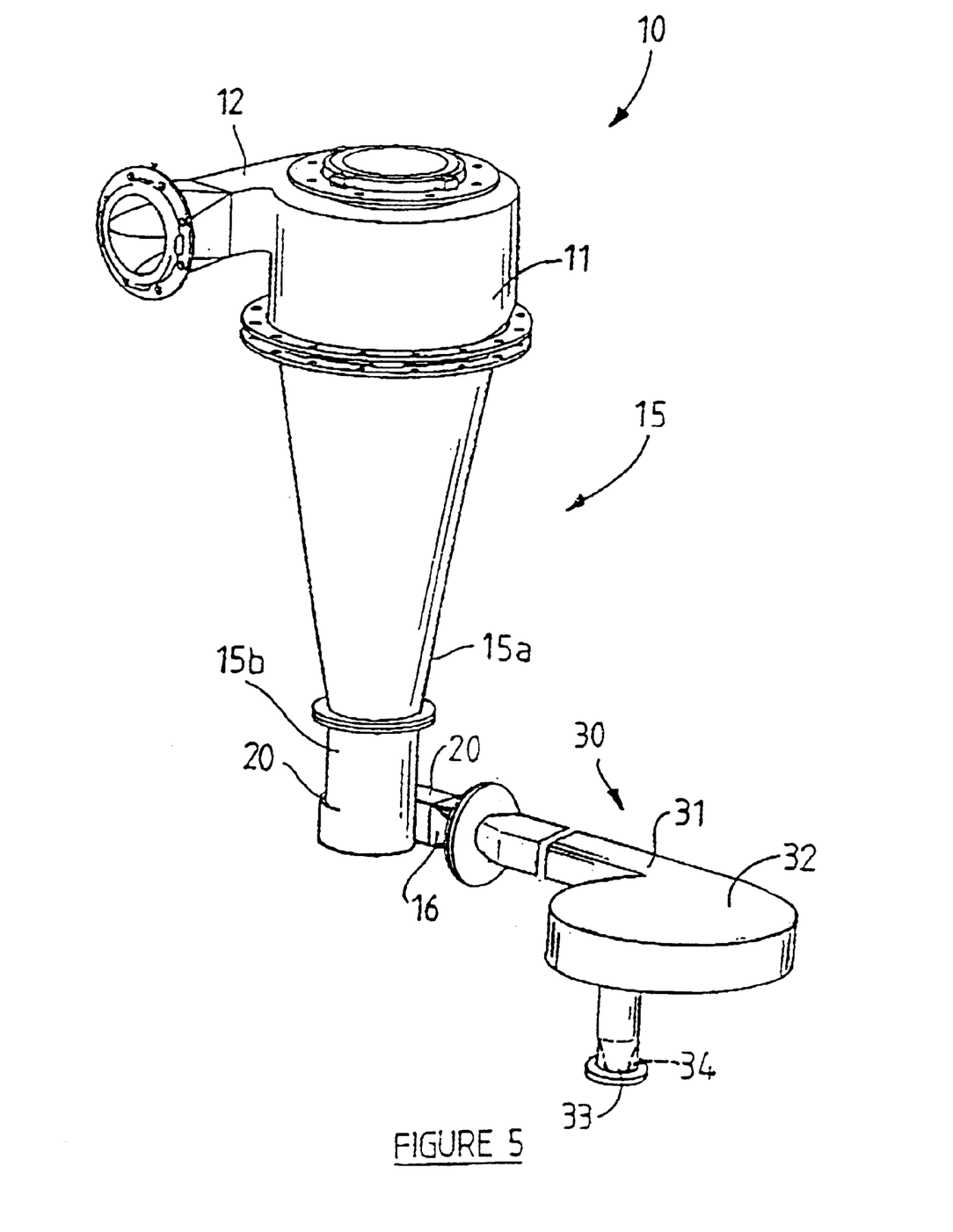
FIG. 5 is a schematic side perspective view of an alternative arrangement of the cyclone in FIG. 1 of the present aspect of the invention.
Figure 6:
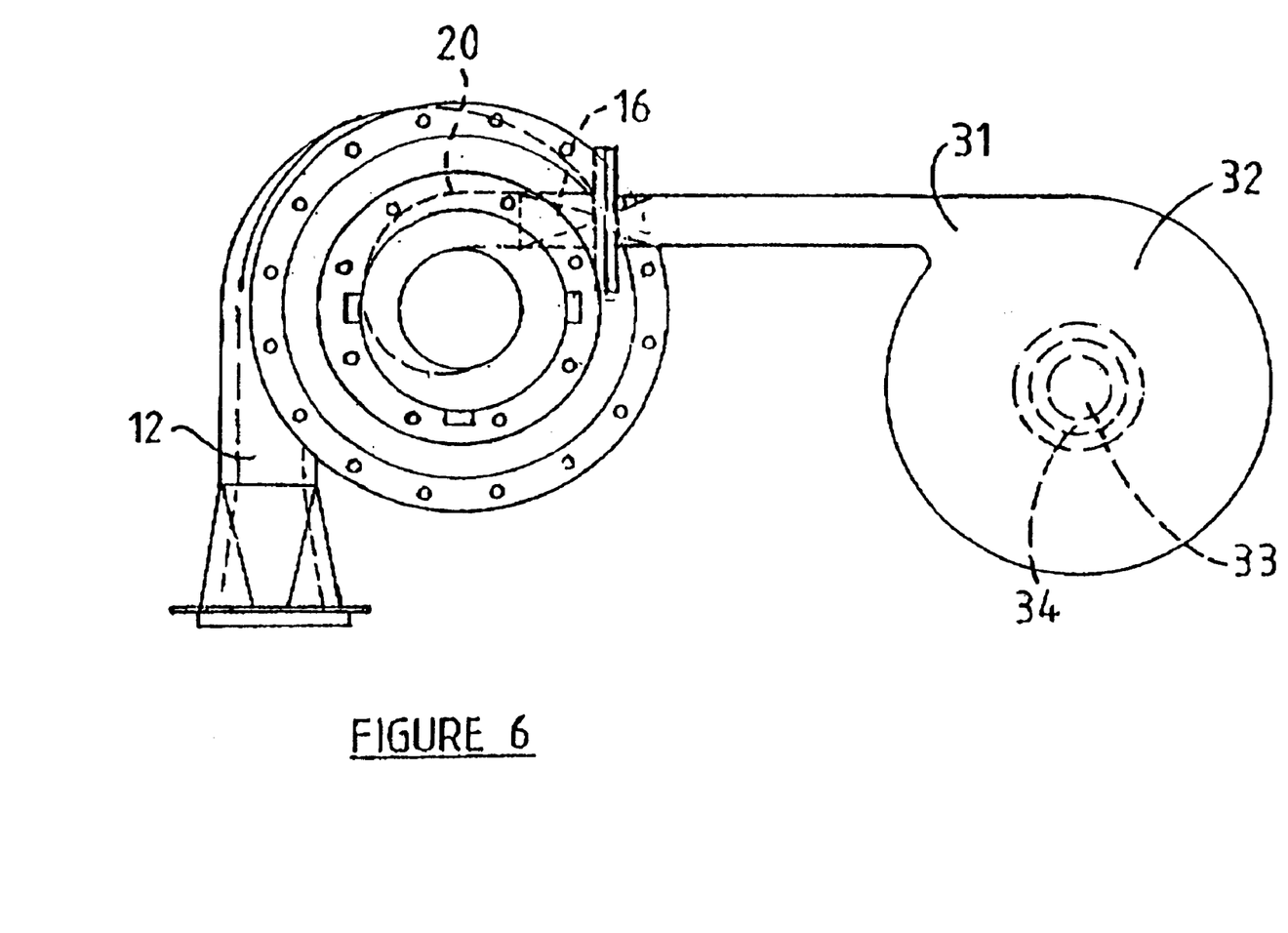
FIG. 6 is a schematic plan view from above of the cyclone in FIG. 5.
Figure 7:
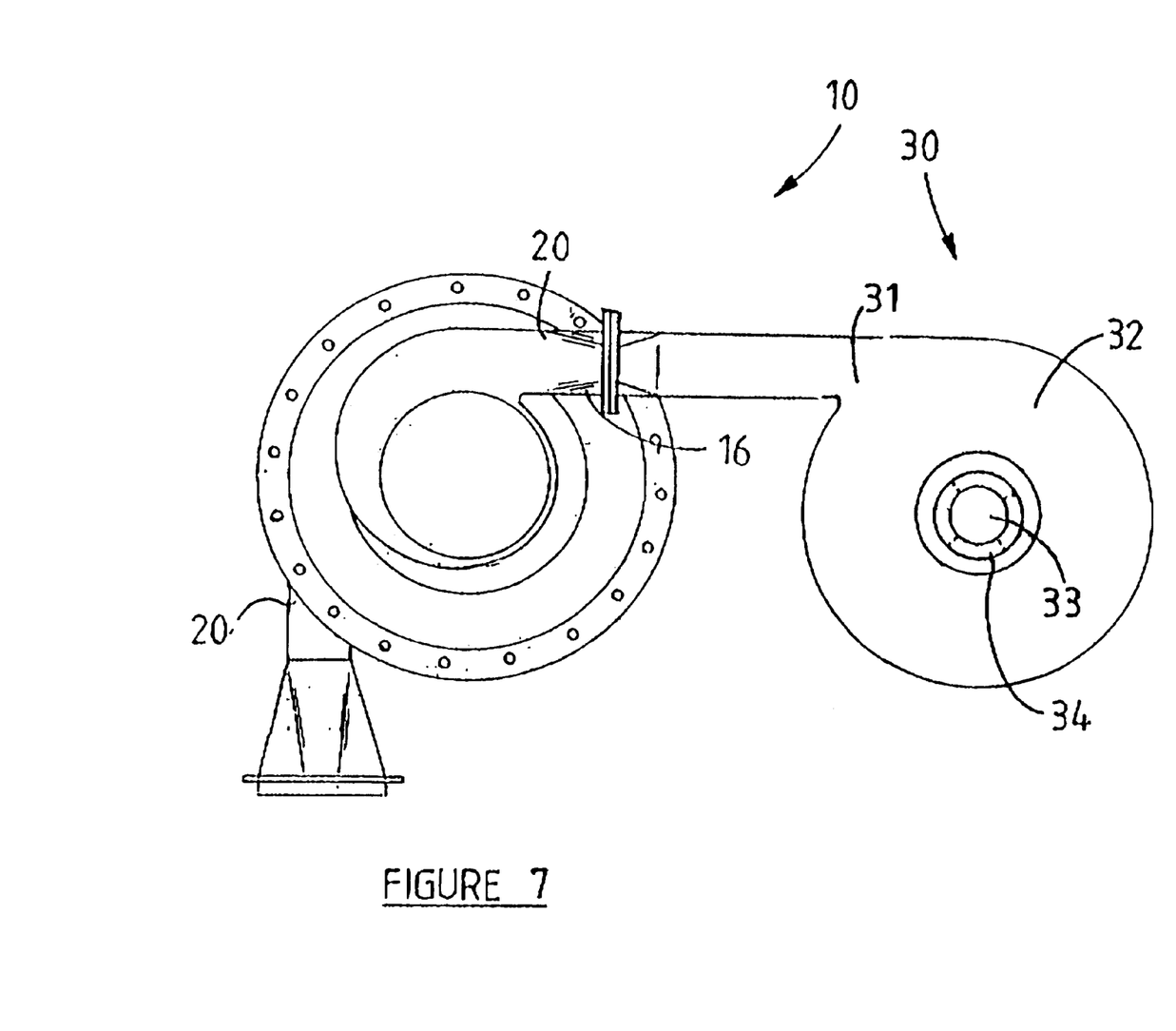
FIG. 7 is a schematic plan view from below of the cyclone in FIG. 5.

An alternative embodiment of the invention is shown in FIGS. 5 to 7 and makes the provision of an evolute structure 20 at the underflow high gravity fraction outlet 16 of the cyclone 10. The evolute structure 20 spirals outwardly from the outlet chamber 15b through about 180 degrees, and merges with the generally tangential high gravity fraction outlet 16 for the coarse fraction of material.

In the arrangement illustrated, the tubular section 15 is in the form of a conical section 15a which diverges inwardly to its end remote from the inlet chamber 11 and includes an outlet chamber 15b which is of substantially constant diameter.

It has been determined that with the above arrangement of the evolute outlet duct 20, flow through the outlet will be enhanced, thus providing an increase in the overall capacity of the cyclone. The advantages of such an increase in performance, will be apparent to persons skilled in the art. It will for example be understood that a smaller less expensive cyclone could be utilized to treat a predetermined tonnage of material.

For some applications, it will be beneficial for a vortex extractor which is shown schematically at 30 to be provided downstream from the high gravity fraction outlet 16. Such vortex extractor 30 will provide back pressure at the outlet 16 which will, in circumstances, reduce misplaced material. The vortex extractor comprises a tangential extractor inlet 31 leading to an extractor chamber 32, and an extractor outlet 33 nozzle which could provide a restriction 34, if necessary.

In certain circumstances, it has also been found to be beneficial to throttle the high gravity fraction outlet 16 to the cyclone, for example by reducing the cross-sectional area of the high gravity fraction outlet 16. Such a throttling will cause a pressure drop across the outlet 16 and increase velocity therethrough which will, in circumstances, reduce product misplaced to waste. Thus, it has been found that with a cyclone having an inlet chamber 11 with a diameter of 660 mm, the diameter of the high gravity fraction outlet 16 should be in the order of 85 mm. has been found that with a cyclone having an inlet chamber 11 with a diameter of 660 mm, the diameter of the inlet 12 should be in the order of 85 mm.

The advantages of the arrangement of the invention will apparent to persons skilled in the art. It will be appreciated that increases in efficiencies can be expected with the arrangements of the invention.

Doubtless variations of the invention exist without departing from the principles set out in the consistory clauses.

What is claimed is:

1. A cyclone adapted for use in a dense medium separation process comprising:

an inlet chamber having a tangential raw material feed inlet;

a vortex finder extending into the inlet chamber and defining a low gravity fraction outlet for a low gravity fraction of separated material;

a conical section opposed to the vortex finder, the conical section extending and continuously converging from the inlet chamber in a direction away from the inlet chamber;

an outlet chamber extending co-axially with the conical section and in a direction opposed to the inlet chamber;

a high gravity fraction outlet for a high gravity fraction of separated material being disposed generally tangentially relative to the outlet chamber, wherein a bottom surface of the outlet chamber is planar providing an unobstructed flow path from the outlet chamber to the high gravity fraction outlet and wherein an unobstructed flow path is provided from an end of the vortex finder extending into the inlet chamber to the high gravity fraction outlet.

2. The cyclone according to claim 1 wherein a volute duct formation is provided adjacent the outlet chamber, the volute duct formation coupling the interior of the outlet chamber to the high gravity fraction outlet.

3. The cyclone according to claim 2 wherein the volute duct formation spirals outwardly from the outlet chamber through about 180 degrees.

4. The cyclone according to claim 2 including a vortex extractor disposed downstream from the high gravity fraction outlet for the high gravity fraction of material, such vortex extractor comprising an extraction chamber, a tangential extraction inlet to the extraction chamber, and an axially disposed extraction outlet.

5. The cyclone according to claim 3 including a vortex extractor disposed downstream from the high gravity fraction outlet for the high gravity fraction of material, such vortex extractor comprising an extraction chamber, a tangential extraction inlet to the extraction chamber, and an axially disposed extraction outlet.

6. The cyclone according to claim 1 wherein the high gravity fraction outlet is throttled to provide an increase in velocity through the high gravity fraction outlet.

7. The cyclone according to claim 6 wherein the ratio between the diameter of the inlet chamber and that of the high gravity fraction outlet is in a range of 7.7–7.8.

8. The cyclone according to claim 6, wherein the ratio between the diameter of the inlet chamber and that of the high gravity fraction outlet is in a range of 7.7–7.8.

9. The cyclone according to claim 6 including a vortex extractor disposed downstream from the high gravity fraction outlet for the high gravity fraction of material, such vortex extractor comprising an extraction chamber, a tangential extraction inlet to the extraction chamber, and an axially disposed extraction outlet.

10. The cyclone according to claim 7 including a vortex extractor disposed downstream from the high gravity fraction outlet for the high gravity fraction of material, such vortex extractor comprising an extraction chamber, a tangential extraction inlet to the extraction chamber, and an axially disposed extraction outlet.

11. The cyclone according to claim 1 including a vortex extractor disposed downstream from the high gravity fraction outlet for the high gravity fraction of material, such vortex extractor comprising an extraction chamber, a tangential extraction inlet to the extraction chamber, and an axially disposed extraction outlet.

12. The cyclone according to claim 11 wherein the axially disposed extraction outlet includes a nozzle acting as a throttle.

13. A method of separating liquid borne raw material into a low gravity fraction and a high gravity fraction in a dense medium separation process comprising the steps of:

providing a cyclone including an inlet chamber having a tangential raw material feed inlet;

a vortex finder extending into the inlet chamber and defining a low gravity fraction outlet for a low gravity fraction of separated material;

a conical section opposed to the vortex finder, the conical section extending and continuously converging from the inlet chamber in a direction away from the inlet chamber;

an outlet chamber extending co-axially with the conical section and in a direction opposed to the inlet chamber;

a high gravity fraction outlet for a high gravity fraction of separated material being disposed generally tangentially relative to the outlet chamber, wherein a bottom surface of the outlet chamber is planar providing an unobstructed flow path from the outlet chamber to the high gravity fraction outlet and wherein an unobstructed flow path is provided from an end of the vortex finder extending into the inlet chamber to the high gravity fraction outlet.

introducing raw feed into the cyclone tangentially through the inlet into the inlet chamber to cause rotational movement thereof within the chamber;

withdrawing the low gravity fraction of the material through the low gravity fraction outlet; and withdrawing the high gravity fraction of material tangentially through the high gravity fraction outlet.

14. The method of separating according to claim 13 wherein the high gravity fraction of material is withdrawn in a volute flow configuration from the outlet chamber.

15. The method according to claim 14 wherein the high gravity fraction outlet is throttled to provide an increase in velocity through such outlet.

16. The method according to claim 14 including the step of providing back pressure at the high gravity fraction outlet.

17. The method according to claim 13 including the step of providing back pressure on the high gravity fraction outlet.

18. The method according to claim 17 wherein the back pressure at the high gravity fraction outlet is provided by means of a vortex extractor comprising an extractor chamber, a tangential extractor inlet to the extractor chamber, and an axial extractor outlet.

19. The method according to claim 18 wherein the extractor outlet includes a nozzle acting as a throttle.

20. The method according to claim 13 wherein the high gravity fraction outlet is throttled to provide an increase in velocity through such outlet.

* * * * *